April 9, 1935. C. H. COTTON ET AL 1,996,953
PACKING DEVICE
Filed Feb. 29, 1932 2 Sheets-Sheet 1
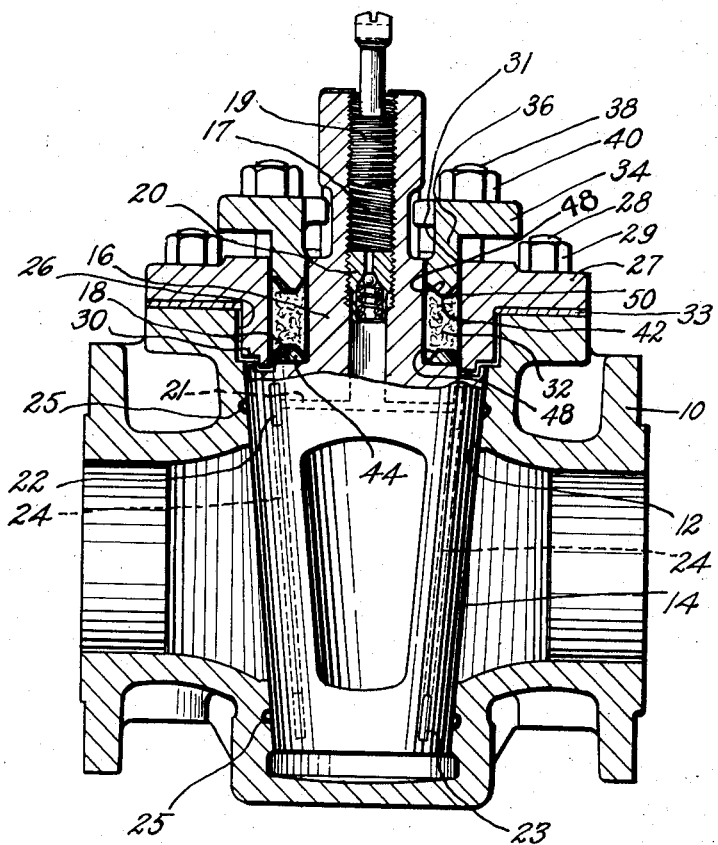
Fig. I.
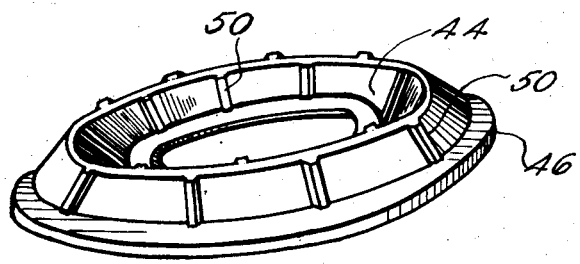
Fig. 4.
Charles H. Cotton and
John B. Roseland INVENTORS
BY Albert J. Henderson
their ATTORNEY.

April 9, 1935.  C. H. COTTON ET AL  1,996,953
PACKING DEVICE
Filed Feb. 29, 1932  2 Sheets-Sheet 2

Charles H. Cotton and
John B. Roselund INVENTORS

BY Albert J. Henderson
their ATTORNEY.

Patented Apr. 9, 1935

1,996,953

UNITED STATES PATENT OFFICE 1,996,953

PACKING DEVICE

Charles H. Cotton and John B. Roselund, Kewanee, Ill., assignors to Walworth Patents Inc., Boston, Mass., a corporation of Massachusetts Application February 29, 1932, Serial No. 595,720

3 Claims. (Cl. 286—7)

This invention relates to packing devices and more particularly to packing devices adapted for use in connection with plug valves and the like.

One object of the invention is to eliminate leakage past the packing of plug valves and the like.

Another object of the invention is to obtain a leak tight joint with the use of a resilient packing and at the same time utilize the pressure applied therefor to the packing to hold the plug upon its seat.

Another object of the invention is to provide means for varying the relative amount of pressure exerted upon the packing to make a leak tight joint and the amount of force applied transversely thereof.

Another object of the invention is to obviate the necessity of changing the size of the stuffing box to obtain a variation in the relative magnitudes of the forces acting upon the packing.

Another object of the invention is to eliminate the necessity of applying such pressure to the packing to secure a leak tight joint as will prevent free operation of the valve.

Another object of the invention is to prevent rotation of packing with the valve element.

Other objects and advantages will become apparent from the following description taken in connection with the accompanying drawings, wherein—

Fig. 1 is a longitudinal section of a plug valve structure embodying one form of the invention.

Fig. 4 is a perspective view of the improved packing washer.

Figure 2:
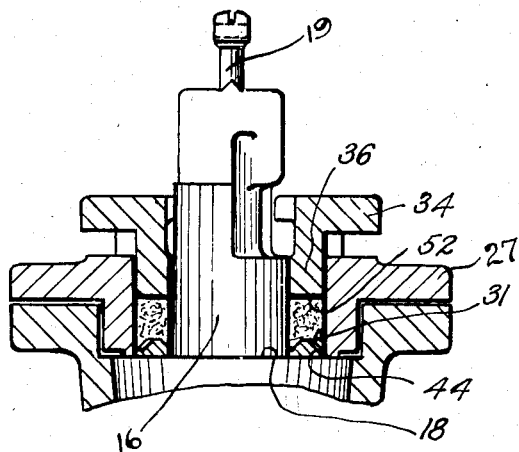
Fig. 2 is a section similar to Fig. 1 but showing a modified form of the invention.

This invention is particularly adapted, although not confined, to use with plug valves of the lubricated type wherein lubricant is introduced to the seating surface when the plug is slightly off its seat preferably by raising the plug. This raising movement of the plug is permitted by the compression of the packing which may be of sufficiently resilient character to permit such movement. It is, however, desirable that the packing be compact enough in body to hold the plug firmly to its seat without extruding under pressure between the clearances of the moving parts of the valve.

The main function of the packing is, of course, to efficiently seal the valve and in this invention means have been provided to obtain efficient sealing while at the same time utilizing packing of compact body but resilient under pressure to maintain the plug to its seat and yet permitting it to be lifted therefrom. Moreover, an efficient sealing of the valve is attained without the need of applying such pressure to the packing as will prevent free rotation of the plug in its seat.

Referring more particularly to the drawings it will be seen from Fig. 1 that the invention has been applied to a plug valve structure comprising a body or housing 10, having a tapered bore 12, forming a seat for a tapered plug valve element 14. The plug 14 is provided with a stem 16 defining a shoulder 18. The stem 16 may be provided with a lubricant reservoir 17, the upper end of which is threaded for the reception of a lubricant screw 19. A check valve 20 may also be positioned in the reservoir 17 below the screw 19 to prevent back flow of lubricant from the valve.

The lubricant may be conveyed to the seating surface 12 in any suitable manner, and in this instance a passage 21 in the plug 14 communicates with the reservoir 17 and with a pair of oppositely disposed grooves 22 formed in the upper end of the plug 14. Similar grooves 23 may be formed in the lower or small end of the plug 14 and lubricant flows thereto and to the seating surface 12 by way of longitudinal grooves 24 and horizontally disposed annular or optionally spiral grooves 25 formed in the seating surface 12 of the housing 10. The housing 10 at the large end of the tapered seating surface 12 is recessed as at 26 for the reception of a plug retaining member 27, secured as by the studs 28 and nuts 29 to the housing 10.

The parts described are assembled in such manner as by the provision of a gasket 33 between the member 27 and the housing 10 that when the plug 14 is seated in the housing 10 a slight clearance 30 will exist between the shoulder 18 and the plug retaining member 27.

The plug retaining member 27 is also provided with a bore 31 concentric with and spaced from the periphery of the stem 16 to form a stuffing box. Disposed in the stuffing box is a packing 32 which is preferably resilient under pressure but of firm and compact character. The packing is preferably molded under pressure to annular form so that its inner periphery will engage the stem 16 and its outer periphery will engage the bore 31.

In accordance with our invention means are provided to spread the packing 32 against the stem 16 and the bore 31, while at the same time holding the plug element 14 to its seat and permitting slight lifting therefrom for the introduction of lubricant to the seating surface 12. Accordingly, a gland member 34, having a projecting annular flange 36, is secured as by the studs 38 and nuts 40 to the retaining member 27. The annular flange 36 is adapted to enter the stuffing box between the stem 16 and the bore 31, with its end surface 42 contacting with the packing 32.

It will be apparent that when the nuts 40 are moved on the studs 38 to bear against the gland 34 longitudinal movement of the gland 34 will create pressure in a longitudinal direction on the packing 32. In order to increase the expansion of the packing in a lateral direction and to spread the packing at the upper end of the stuffing box against the stem 16 and the bore 31, the end surface 42 of the gland 34 is formed with a V-shaped contour, or, if desired, the end surface may be left flat and a wedge-shaped ring inserted between the gland and packing.

In order to spread the packing laterally against the stem 16 and the bore 31 at a point adjacent the shoulder 18, an annular wedge-shaped packing washer 44, having a flanged face 46, is seated upon the shoulder 18 of the plug element 14. The packing washer 46 may be of metal and formed by casting, in which case the under surface of the flange 46 is preferably machined for engagement with the shoulder 18, or this packing washer 44 may be molded from some synthetic organic substance, such as Bakelite, whereby no machining will be necessary.

If desired, the surfaces of the packing 32 which contact with the flange 36 and the packing washer 44 may be formed with V-shaped recesses 48 for the reception of the V-shaped end surfaces of the gland 34 and the packing washer 44.

The surface 42 of the gland 34 and the wedge-shaped surface of the washer 44 may be formed to include any desired angle as will be apparent. Every change in the angles will cause a change in the relative magnitude of the pressure exerted to make a leak-tight joint and the magnitude of the force exerted longitudinally by the gland 34. In this manner a variation between the relative magnitude of the two forces can be obtained without the necessity of changing the dimensions of the stuffing box. The force exerted to spread the packing laterally may be increased or decreased as desired by merely changing the angles of the surface 42 and the surface of the washer 44.

In addition to increasing the lateral spreading of the packing 32, means have been provided to prevent its rotation in the stuffing box and to prevent rotation of the washer 44 with the plug 14. This is accomplished by provision of a plurality of lugs 50 on the sloping surfaces of the packing washer 44 and the end surface 42 of the gland 34. These lugs 50 are preferably arranged in staggered formation upon the sloping surfaces to distribute the holding effect of a small number of lugs over the area of the washer, and it will be apparent that these lugs will become embedded in the packing when pressure is applied by the gland 34 and will prevent rotation of the packing in the stuffing box and rotation of the washer 44 with the plug 14.

In the embodiment shown in Fig. 2 the packing gland 34 is provided with a projecting annular flange 36, the end surface 52 of which is formed flat and substantially normal to the axis of the gland 34. The packing washer 44 is again utilized and will, in this instance, serve to spread the packing adjacent the shoulder 18 of the plug 14, while the packing gland 34 will exert pressure chiefly in a longitudinal direction.

Figure 3:
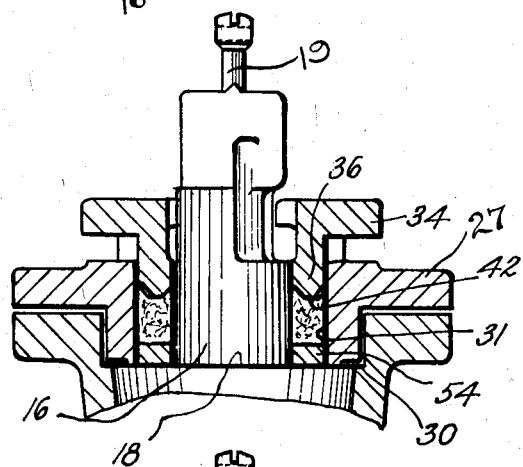
Fig. 3 is a view similar to Fig. 1 but showing a further modified form of the invention.

As a further modification the packing washer 44 may be omitted and a flat annular washer 54 substituted therefor as shown in Fig. 3. The end surface 42 of the packing gland 34 may be formed with a V-shaped contour as in the embodiment illustrated in Fig. 1. In the embodiment shown in Fig. 3 the packing gland 34 will exert pressure in a longitudinal direction, while the end surface 42 thereof will serve to spread the packing laterally against the stem 16 and the bore 31.

Figure 5:
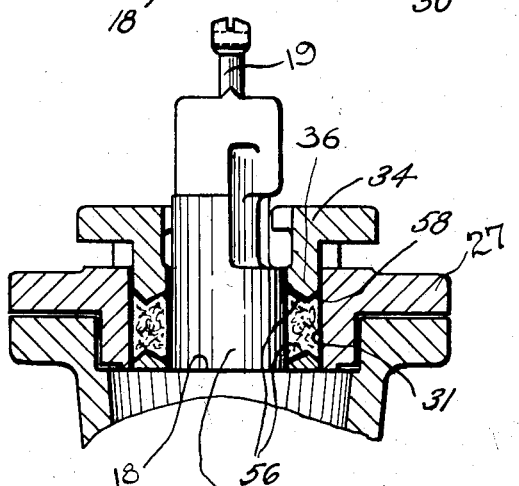
Fig 5 is a view similar to Fig. 1 but showing a further modification.

Various other arrangements may be employed which embody the novel features of this invention. It may be desired to urge the packing with greater force toward the stem 16 than the bore 31. In this case as shown in Fig. 5 the angle of the end surface of the gland 34 may be unsymmetrical, that is, with one side 56 substantially longer than the side 58. The angle of the wedge-shaped ring 44 may likewise be off center. The flange 46 provides a flat seat for the edges of the packing and thus prevents it being extruded past the washer 44 as might occur if the sloping surfaces of the washer emerged at the edge thereof. It will be apparent that the packing may be urged with greater force toward the bore 31 than the stem 16 merely by making the side 58 longer than the side 56.

It will be observed that in all the arrangements shown a packing washer either of wedge shape form, as in Figs. 1 and 2, or of flat form, as in Fig. 3, is provided. Such an arrangement facilitates the rotation of the plug element on its seat without the necessity of applying such pressure to the packing to secure a leak-tight joint as will prevent free rotation of the plug 14. It will also be apparent that the pressure applied to the packing to obtain a leak-tight joint is utilized for holding the plug element 14 to its seat without the necessity of additional elements to obtain this result.

The relative magnitude of the pressure exerted to make a leak-tight joint and the magnitude of the force exerted longitudinally is controlled by the angles of the end surface of the gland and the packing washer or by each alone. Variation of these relative forces may be obtained merely by changing the angles of the end surface of the gland and the packing washer and thus the necessity of changing the dimensions of the stuffing box to obtain a variation is avoided.

Under all conditions the packing will be forced laterally against the stem 16 and the bore 31 thus sealing the valve against leakage, although the packing utilized is of comparatively firm and compact character so that there will be no tendency for particles of packing to work their way down between the seating surfaces of the plug and the valve housing. The packing may also be rigid enough to preclude any tendency to extrude between the clearances of the moving parts of the valve, the plug being held firmly to its seat and a leak-tight joint secured.

We claim:—

1. As a new article of manufacture, an annular wedge-shaped packing washer having projecting lugs thereon, said lugs being disposed in staggered relation on opposite sides of said washer.

2. As a new article of manufacture, an annular wedge-shaped packing washer having projecting lugs thereon, said lugs being disposed in staggered relation on opposite sides of said washer, and a flat projecting flange on the other side of said washer forming a seating surface.

3. In a stuffing box, a pair of spaced and relatively rotatable side walls bounded at one end by a shoulder projecting from one wall to the other, a packing element disposed between said walls, a wedge-shaped packing washer seated on the shoulder and projecting inwardly between said walls, a flat projecting flange on the seating surface of said washer and engaging the spaced walls, a plurality of staggered projections on the packing engaging surfaces of the washer to prevent rotation of said packing and washer with said rotatable wall, and a gland for exerting pressure on the other end of said packing to force it onto the wedge-shaped washer and thereby urge said packing laterally against the opposing surfaces of the spaced walls.

CHARLES H. COTTON.
JOHN B. ROSELUND.